(12) United States Patent
Dyer

(10) Patent No.: US 10,113,803 B2
(45) Date of Patent: Oct. 30, 2018

(54) ROUND HEAT EXCHANGER

(71) Applicant: HAMILTON SUNDSTRAND CORPORATION, Charlotte, NC (US)

(72) Inventor: Gerald P. Dyer, Suffield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 352 days.

(21) Appl. No.: 14/540,841

(22) Filed: Nov. 13, 2014

(65) Prior Publication Data

US 2016/0138873 A1 May 19, 2016

(51) Int. Cl.
*F28D 7/00* (2006.01)
*F28F 3/00* (2006.01)
*B64D 37/34* (2006.01)

(52) U.S. Cl.
CPC ........... *F28D 7/0008* (2013.01); *B64D 37/34* (2013.01); *F28F 3/005* (2013.01)

(58) Field of Classification Search
CPC .... F28D 9/0012; F28D 9/0018; F28D 9/0025; F28D 9/0037; F28D 9/0043; F28D 9/0006; F28D 2021/0089; F28D 9/005; F28D 2021/0087; F28F 3/08; F28F 3/086; F28F 3/083
USPC .......................... 165/165–167, 157, 916, 357
See application file for complete search history.

(56) References Cited

U.S. PATENT DOCUMENTS

| | | | | |
|---|---|---|---|---|
| 1,916,768 A * | 7/1933 | Melcher | ................... | F28F 3/083 165/167 |
| 2,217,316 A * | 10/1940 | Kallsteinus | ............... | F28D 9/04 165/167 |
| 2,690,328 A * | 9/1954 | Keesling | ................... | F28F 7/02 165/166 |
| 3,865,185 A * | 2/1975 | Ostbo | ..................... | F28F 3/086 165/165 |
| 3,882,934 A * | 5/1975 | Knoos | ....................... | F28D 9/04 165/164 |

(Continued)

FOREIGN PATENT DOCUMENTS

| | | |
|---|---|---|
| GB | 1405976 | 7/1973 |
| GB | 2028995 | 3/1980 |

(Continued)

OTHER PUBLICATIONS

Search Report dated May 26, 2016 in UK Application No. GB1519641.3.

*Primary Examiner* — David Teitelbaum
*Assistant Examiner* — For K Ling
(74) *Attorney, Agent, or Firm* — Snell & Wilmer, L.L.P.

(57) ABSTRACT

A heat exchanger includes a first fluid laminate defining a first fluid cavity that is in fluid communication with and downstream from a first inlet such that at least some of the first fluid flows into the first fluid cavity. The heat exchanger includes a second fluid laminate positioned adjacent to and in contact with the first fluid laminate. The first fluid laminate and the second fluid laminate define a portion of a cylinder. The second fluid laminate defines a second fluid cavity that is in fluid communication with and downstream from a second inlet such that at least some of the second fluid flows into the second fluid cavity, such that heat may transfer between the first fluid and the second fluid via the first fluid laminate and the second fluid laminate.

14 Claims, 5 Drawing Sheets

(56) References Cited

U.S. PATENT DOCUMENTS

| | | | | |
|---|---|---|---|---|
| 5,464,056 | A * | 11/1995 | Tajima | F28D 9/0012 123/196 AB |
| 5,558,154 | A * | 9/1996 | Lefeber | F28D 9/0012 165/166 |
| 5,582,245 | A * | 12/1996 | Niimi | F28D 9/0012 165/154 |
| 5,655,600 | A * | 8/1997 | Dewar | F28D 9/0062 165/166 |
| 6,170,568 | B1 * | 1/2001 | Valenzuela | F28D 9/0012 165/166 |
| 6,446,712 | B1 * | 9/2002 | Wu | F28D 9/0012 165/167 |
| 6,497,274 | B2 * | 12/2002 | Cheadle | F28D 9/0012 123/196 AB |
| 6,814,133 | B2 * | 11/2004 | Yamaguchi | F28D 9/0012 123/196 A |
| 7,013,963 | B2 * | 3/2006 | Laine | F28D 9/0012 165/157 |
| 2001/0010262 | A1 * | 8/2001 | Komoda | F28D 9/0043 165/167 |
| 2003/0183374 | A1 * | 10/2003 | Voss | B01D 5/0015 165/110 |
| 2006/0151147 | A1 * | 7/2006 | Symonds | F28D 9/0012 165/11.1 |
| 2009/0288617 | A1 * | 11/2009 | Hiyama | B60H 1/14 123/41.14 |
| 2012/0325446 | A1 * | 12/2012 | Wakamatsu | F28F 3/044 165/167 |

FOREIGN PATENT DOCUMENTS

| | | |
|---|---|---|
| WO | 9517272 | 6/1995 |
| WO | 03056267 | 7/2003 |
| WO | 2004023055 | 3/2004 |
| WO | 2010103190 | 9/2010 |

* cited by examiner

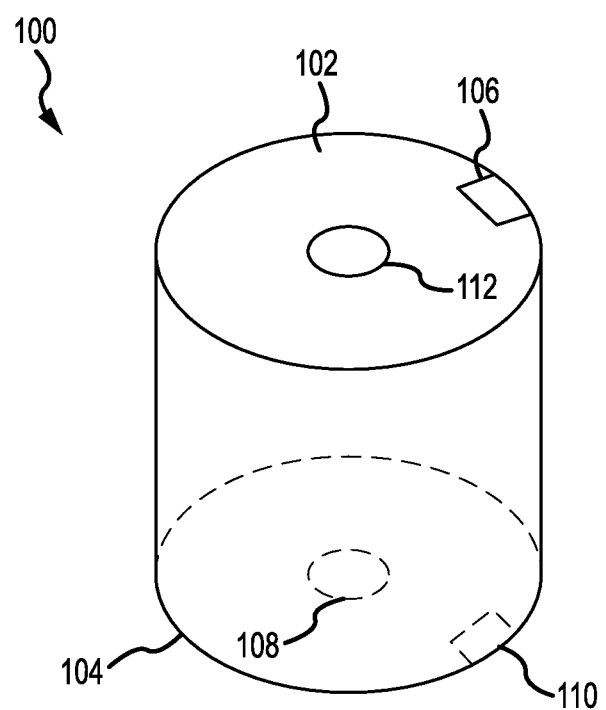
FIG.1
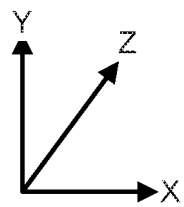

ROUND HEAT EXCHANGER

FIELD

The present disclosure relates to aircraft fuel systems, and more particularly to heat exchangers.

BACKGROUND

As an aircraft gains elevation, the ambient temperatures drop. Fuel tanks may be positioned in such a location on the aircraft that the ambient temperature affects the temperature of the fuel. At the same time, as an aircraft's engine continues to produce energy, lubricating oil may rise in temperature. Aircraft may include heat exchangers designed to transfer thermal energy between the cold fuel and the hot lubricating oil.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

What is described is a heat exchanger for use in an aircraft. The heat exchanger includes a first inlet configured to receive a first fluid and a second inlet configured to receive a second fluid. The heat exchanger also includes a first fluid laminate defining a first fluid cavity that is in fluid communication with and downstream from the first inlet. At least a portion of the first fluid flows into the first fluid cavity. The heat exchanger also includes a second fluid laminate positioned adjacent to and in contact with the first fluid laminate. The first fluid laminate and the second fluid laminate define a portion of a cylinder. The second fluid laminate defines a second fluid cavity that is in fluid communication with and downstream from the second inlet such that at least a portion of the second fluid flows into the second fluid cavity. Heat may transfer between the first fluid and the second fluid via the first fluid laminate and the second fluid laminate. The heat exchanger also includes a first outlet in fluid communication with and downstream from the first fluid cavity such that the first fluid may exit the heat exchanger. The heat exchanger also includes a second outlet in fluid communication with and downstream from the second fluid cavity such that the second fluid may exit the heat exchanger.

Also described is a heat exchanger for transferring thermal energy between a fuel and an oil. The heat exchanger includes a longitudinal axis and a plurality of plates positioned adjacent each other along the longitudinal axis. The plurality of plates defines a cylinder. The plurality of plates includes a first axial end plate defining an oil inlet and a fuel outlet. The plurality of plates also includes a second axial end plate defining a fuel inlet and an oil outlet. The plurality of plates also includes a first fuel laminate defining a first fuel cavity that is in fluid communication with and downstream from the fuel inlet such that at least some of the fuel flows into the first fuel cavity. The plurality of plates also includes a first oil laminate adjacent the first fuel laminate and defining a first oil cavity that is in fluid communication with and downstream from the oil inlet such that at least some of the oil flows into the first oil cavity.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1 illustrates a heat exchanger for use in an aircraft, in accordance with various embodiments;

DETAILED DESCRIPTION

Figure 2:
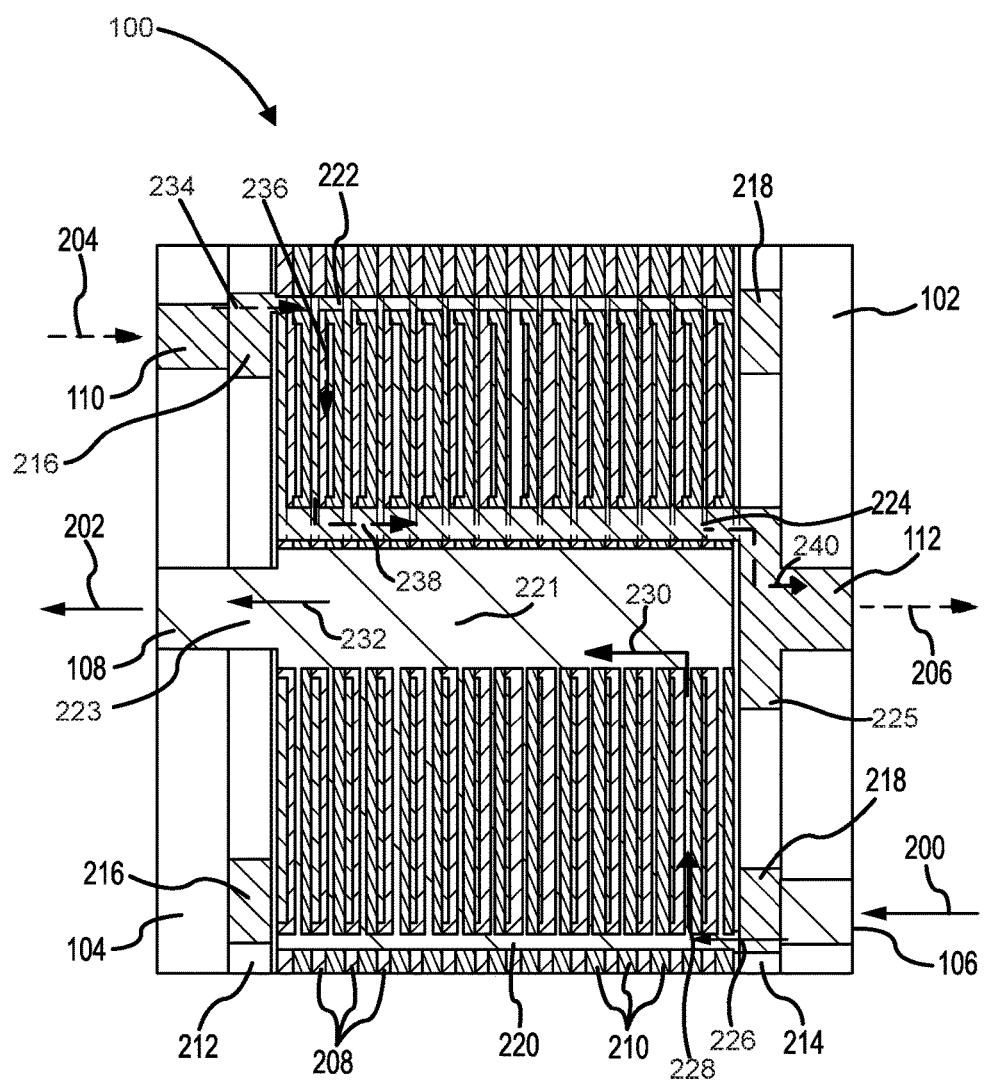
FIG. 2 illustrates a cross-sectional view of the heat exchanger of FIG. 1, in accordance with various embodiments.
Figure 2:
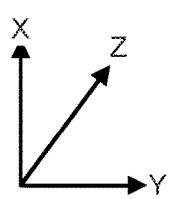

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

FIG. 1 illustrates a heat exchanger 100 for use in an aircraft. In various embodiments, heat exchanger 100 may be utilized in other vehicles having an engine, such as a motorcycle, a car, a boat or the like. In various embodiments, heat exchanger 100 may be utilized in any system which may benefit from a transfer of heat between two separate fluids. Heat exchanger 100 may be positioned near an engine of an aircraft. In various embodiments, heat exchanger 100 may be mounted to the exterior of an engine on brackets, manifolds or the like. In this manner, heat exchanger 100 may be part of the controls and externals of the engine.

Heat exchanger 100 may have a fuel inlet 106 and a fuel outlet 108. Heat exchanger 100 may also have an oil inlet 110 and an oil outlet 112. Fuel may be pumped into heat exchanger 100 via fuel inlet 106 and flow out of heat exchanger 100 via the fuel outlet. In various embodiments, any other fluid may be used instead of fuel. This fuel may be relatively cold while the aircraft is traveling at a high altitude. Accordingly, the fuel may be at such a temperature that the fuel begins to freeze before being pumped into heat exchanger 100. In this manner, pieces of frozen fuel may accumulate in the liquid fuel. Oil may be pumped into oil inlet 110 and flow out of heat exchanger 100 via oil outlet 112. In various embodiments, any other fluid may be used instead of oil. This oil may have a relatively high temperature as it is pumped into oil inlet 110, as it may have been used to lubricate heated components within the engine. In various embodiments, the fuel entering heat exchanger 100 is of lower temperature than the oil entering heat exchanger 100.

It is desirable for the fuel to increase in temperature before it is provided to the engine, especially so as to remove frozen fuel from the fluid fuel. Similarly, it is desirable for the oil to be cooled before being circulated back into the engine. Heat exchanger 100 is designed such that the heat from the oil is partially distributed to the fuel, both heating the fuel and cooling the oil.

The body of heat exchanger 100 may be cylindrical. An X-Y-Z axis is shown to illustrate the relative position of components within heat exchanger 100. At one axial end of heat exchanger 100 is a first axial end plate 102. At the other axial end of heat exchanger 100 is a second axial end plate 104. First axial end plate 102 includes oil outlet 112 and fuel inlet 106. Oil outlet is illustrated to be circular in shape and fuel inlet 106 is illustrated to be rectangular in shape. In various embodiments, oil outlet 112 and fuel inlet 106 may each have any shape, such as circular, rectangular, triangular or the like.

Second axial end plate 104 includes fuel outlet 108 and oil inlet 110. Fuel outlet 108 is illustrated to be circular and oil inlet 110 is illustrated to be rectangular. In various embodiments, fuel outlet 108 and oil inlet 110 may each have any shape, such as circular, rectangular, triangular or the like.

Oil outlet 112 is illustrated to be in the center of first axial end plate 102. In various embodiments, oil outlet 112 may be positioned elsewhere on first axial end plate or on a curved surface of heat exchanger 100. Fuel inlet 106 is illustrated to be at the perimeter of first axial end plate 102. In various embodiments, fuel inlet 106 may be positioned elsewhere on first axial end plate 102 or on the curved surface of heat exchanger 100. Fuel outlet 108 is illustrated to be in the center of second axial end plate 104. In various embodiments, fuel outlet 108 may be positioned elsewhere on second axial end plate 104 or on the curved surface of heat exchanger 100. Likewise, oil inlet 110 is illustrated to be at the perimeter of second axial end plate 104. In various embodiments, oil inlet 110 may be positioned elsewhere on second axial end plate 104 or on the curved surface of heat exchanger 100. In various embodiments, oil outlet 112, fuel inlet 106, oil inlet 110 and/or fuel outlet 108 may each be positioned anywhere on heat exchanger 100.

A hose or other pipe may be connected to each of oil outlet 112, fuel inlet 106, oil inlet 110 and/or fuel outlet 108. Heat exchanger 100 may include connectors for connecting the hoses and/or pipes.

FIG. 2 illustrates a cross-sectional view of heat exchanger 100 viewed along the Z axis. FIG. 2 includes the X-Y-Z axis. Heat exchanger 100 includes first axial end plate 102 and second axial end plate 104. First axial end plate 102 includes oil outlet 112 and fuel inlet 106. Second axial end plate 104 includes fuel outlet 108 and oil inlet 110.

Heat exchanger 100 also includes a fuel annulus plate 214 and an oil annulus plate 212. Fuel annulus plate 214 is positioned adjacent to and axially inward from first axial end plate 102. Fuel annulus plate 214 includes a fuel annulus 218. Fuel annulus 218 may be in fluid communication with fuel inlet 106, such that it can to receive fuel via fuel inlet 106. Fuel annulus 218 is aligned with fuel inlet 106 such that fuel pumped into fuel inlet 106 may flow into fuel annulus 218. Fuel annulus 218 may extend circumferentially around fuel annulus plate 214. Fuel annulus 218 may be machined or etched from fuel annulus plate 214 such that fuel annulus plate 214 defines fuel annulus 218.

When fuel enters fuel annulus 218, the fuel may flow around the entire fuel annulus 218. In this manner, if frozen pieces of fuel are present in the fluid fuel, heat exchanger 100 will not become clogged with frozen fuel, as the frozen chunks of fuel may be distributed around entire fuel annulus 218 such that fluid fuel may flow around the frozen fuel.

Fuel annulus plate 214 may define an oil-out connector channel 225. Oil-out connector channel 225 may align with oil outlet 112 such that oil may flow through oil-out connector channel 225 to oil outlet 112.

Similarly, oil annulus plate 212 is positioned adjacent to and axially inward from second axial end plate 104. Oil annulus plate 212 includes an oil annulus 216. Oil annulus 216 may be in fluid communication with oil inlet 110, such that it can receive oil via oil inlet 110. Oil annulus 216 is aligned with oil inlet 110 such that oil pumped into oil inlet 110 may flow into oil annulus 216. This oil may then be displaced throughout oil annulus 216. Oil annulus 216 may extend circumferentially around oil annulus plate 212. Oil annulus plate 212 may be etched or machined such that oil annulus plate 212 defines oil annulus 216.

Oil annulus plate 212 may define a fuel-out connector channel 223. Fuel-out connector channel 223 may align with fuel outlet 108 such that fuel may flow through fuel-out connector channel 223 to fuel outlet 108.

Positioned in an alternating fashion in the axial direction between fuel annulus plate 214 and oil annulus plate 212 are fuel laminates and oil laminates. Each fuel laminate 208 and oil laminate 210 may be etched to define an axial fuel-in channel 220 and an axial oil-in channel 222. Axial fuel-in channel 220 may align with fuel annulus 218. Fuel may flow into axial fuel-in channel 220 from fuel annulus 218. From axial fuel-in channel 220, fuel may flow radially inward via a cavity etched in each fuel laminate 208 towards the center of heat exchanger 100. In various embodiments, the cavity may be formed in any fashion. Axial oil-in channel 222 may align with oil annulus 216. Oil may flow into axial oil-in channel 222 from oil annulus 216. From axial oil-in channel 222, oil may flow radially inward via a cavity etched in each oil laminate 210 towards the center of heat exchanger 100. In various embodiments, the cavity may be formed in any fashion.

Each fuel laminate 208 and oil laminate 210 may also be etched to include an axial fuel-out channel 221 and an axial oil-out channel 224. Axial fuel-out channel 221 may align with fuel-out connector channel 223, such that fuel may flow through axial fuel-out channel 221 towards fuel-out connector channel 223. Similarly, axial oil-out channel 224 may be aligned with oil-out connector channel 225 such that oil may flow through axial oil-out channel 224 towards oil-out connector channel 225.

The fuel that flows through axial fuel-in channel 220 to axial fuel-out channel 221 may continue to flow through cavities of fuel laminates 208 towards fuel outlet 108. Fuel may flow out heat exchanger 100 via fuel outlet 108. Similarly, the oil that flows through axial oil-in channel 222 to axial oil-out channel 224 may continue to flow through cavities of oil laminates 210 towards oil outlet 112. Oil may flow out heat exchanger 100 via oil outlet 112.

FIG. 2 includes arrows to illustrate the flow of fuel and of oil within heat exchanger 100. Arrow 200 illustrates fuel entering heat exchanger 100 via fuel inlet 106. Arrow 226 illustrates fuel flowing from fuel inlet 106 through fuel annulus 218 and into axial fuel-in channel 220. Arrow 228 illustrates fuel flowing axially inward through a cavity of fuel laminate 208.

Arrow 204 illustrates oil entering heat exchanger 100 via oil inlet 110. Arrow 234 illustrates oil flowing from oil inlet 110 through oil annulus 216 and into axial oil-in channel 222. Arrow 236 illustrates oil flowing axially inward through a cavity of oil laminate 210.

After a period of time after fuel and oil flow into heat exchanger 100, all or nearly all fluid paths within heat exchanger 100 contain fuel and oil. In this state, fuel is in contact with a surface of each fuel laminate 208 and oil is in contact with a surface of each oil laminate 210. Fuel laminate 208 and oil laminate 210 are comprised of a material with a relatively high heat transfer coefficient, such as metal, to facilitate transfer of heat. The heat from the oil transfers to oil laminate 210 via contact, where it transfers to an adjacent fuel laminate 208. The heat may then transfer to the fuel via contact between the fuel and the fuel laminate 208.

After flowing axially inward through a cavity of fuel laminate 208 and warming along the way, the fuel flows into axial fuel-out channel 221 as indicated by arrow 230. The fuel then flows along axial fuel-out channel 221 until it reaches fuel-out connector channel 223. Arrow 232 indicates the flow of fuel via fuel-out connector channel 223 into fuel outlet 108. Arrow 202 illustrates fuel exiting heat exchanger 100 via fuel outlet 108. As illustrated, fuel annulus 218 is downstream from fuel inlet 106, axial fuel-in channel 220 is downstream from fuel annulus 218, fuel laminate 208 is downstream from axial fuel-in channel 220, axial fuel-out channel 221 is downstream from fuel laminate 208, fuel-out connector channel 223 is downstream from axial fuel-out channel 221 and fuel outlet 108 is downstream from fuel-out connector channel 223.

After flowing axially inward through a cavity of oil laminate 210 and cooling along the way, the oil flows into axial oil-out channel 224, as indicated by arrow 238. The oil then flows along axial oil-out channel 224 until it reaches oil-out connector channel 225. Arrow 240 illustrates the flow of oil from axial oil-out channel 224 via oil-out connector channel 225 and into oil outlet 112. From oil outlet 112, the cooled oil flows out of heat exchanger 100 via oil outlet 112, as illustrated with arrow 206. As illustrated, oil annulus 216 is downstream from oil inlet 110, axial oil-in channel is downstream from oil annulus 216, oil laminate 210 is downstream from axial oil-in channel 222, axial oil-out channel 224 is downstream from oil laminate 210, oil-out connector channel 225 is downstream from axial oil-out channel 224 and oil outlet 112 is downstream from oil-out connector channel 225.

Figure 3:
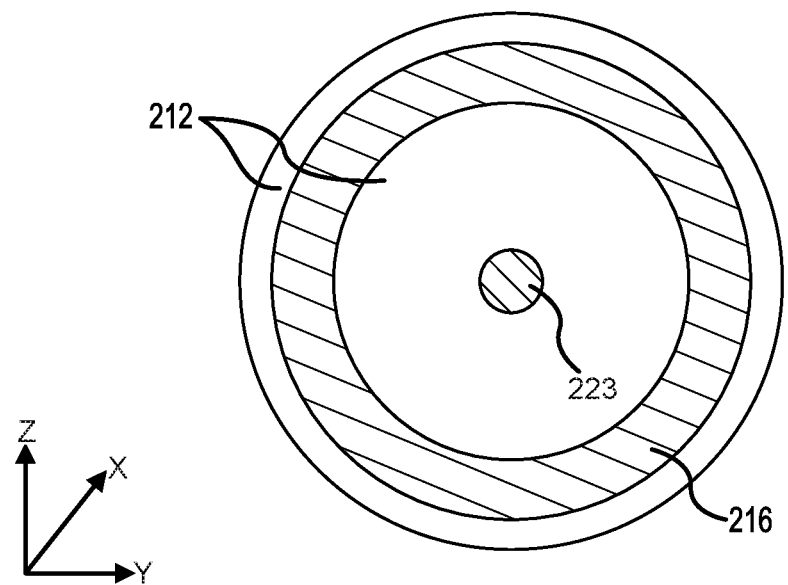
FIG. 3 illustrates an axial view of an oil annulus plate, in accordance with various embodiments.

FIG. 3 illustrates an axial view of oil annulus plate 212. As shown, oil annulus plate 212 includes oil annulus 216. Oil annulus plate 212 also includes fuel-out connector channel 223. Oil annulus plate 212 may be made of a metal, such as aluminum. Oil annulus 216 and/or fuel-out connector channel 223 may be machined or etched into the material of oil annulus plate 212.

Adjacent one axial end axially of oil annulus plate 212 is oil inlet 110 of second axial end plate 104 of FIG. 2. Oil inlet 110 is aligned with a portion of oil annulus 216. When oil enters oil annulus 216 via oil inlet 110, oil will flow circumferentially around oil annulus 216. On the other axial end of oil annulus plate 212 will be axial oil-in channel 222 of FIG. 2. Oil will flow to axial oil-in channel 222 via oil annulus 216.

Fuel-out connector channel 223 is aligned with axial fuel-out channel 221 of FIG. 2 on one axial end of oil annulus plate and with fuel outlet 108 on the other axial end of oil annulus plate 212. Fuel may flow from axial fuel-out channel 221 through fuel-out connector channel 223 to fuel outlet 108.

Figure 4:
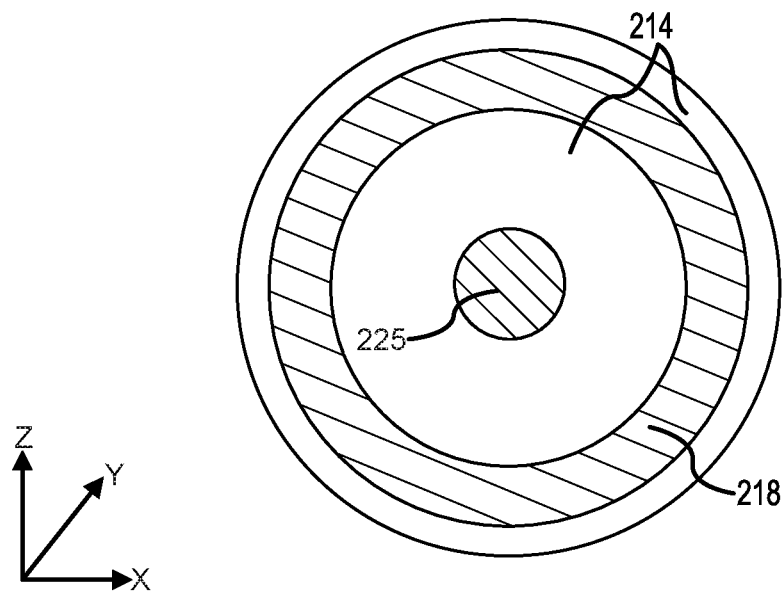
FIG. 4 illustrates an axial view of a fuel annulus plate, in accordance with various embodiments.

FIG. 4 illustrates an axial view of fuel annulus plate 214. Fuel annulus plate 214 includes fuel annulus 218 and oil-out connector channel 225. Fuel annulus plate 214 may be made of a metal, such as aluminum. Fuel annulus 218 and oil-out connector channel 225 may be machined or etched into fuel annulus plate 214.

On one axial end of fuel annulus plate, fuel annulus 218 aligns with fuel inlet 106 of FIG. 2. The other axial end of fuel annulus plate 214 is axial fuel-in channel 220. Fuel may flow through fuel annulus 218 from fuel inlet 106 and flow into axial fuel-in channel 220.

With reference to FIG. 4 and FIG. 2, one axial end of fuel annulus plate may be in contact with first axial end plate 102 and the other axial end of fuel annulus plate 214 may be in contact with an oil laminate 210 or a fuel laminate 208. On one axial end of fuel annulus plate, oil-out connector channel 225 may align with oil outlet 112. The other axial end of fuel annulus plate may be positioned such that oil-out connector channel 225 is aligned with axial oil-out channel 224. Oil may be displaced via axial oil-out channel 224, flow through oil-out connector channel 225 and flow out of heat exchanger 100 via oil outlet 112.

Figure 5:
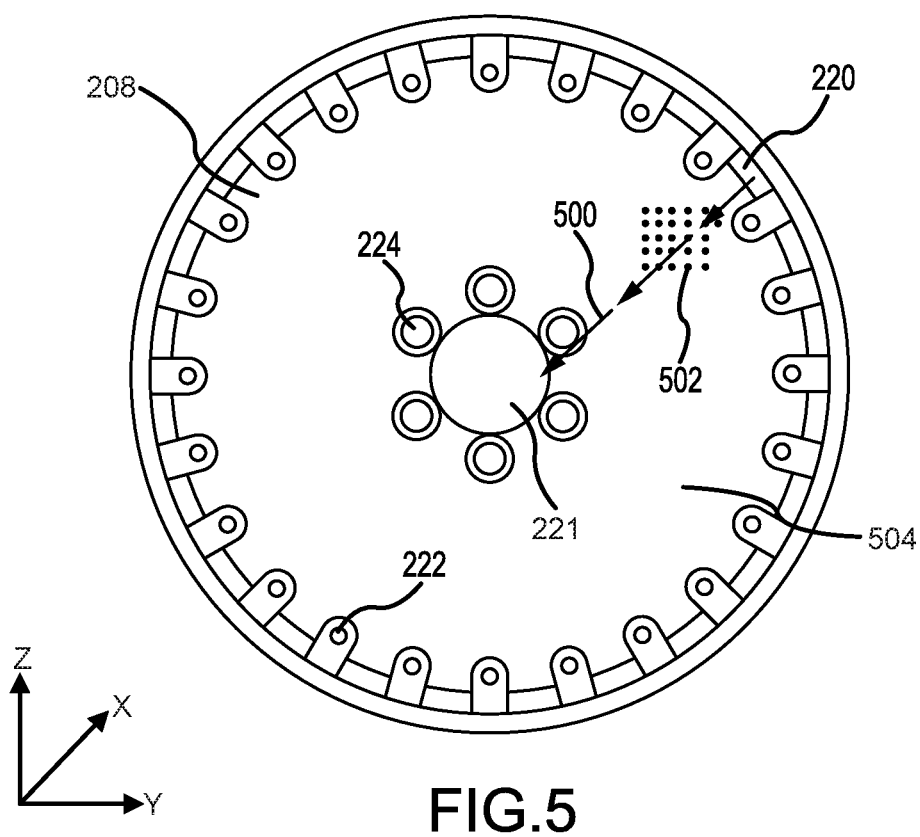
FIG. 5 illustrates a fuel laminate, in accordance with various embodiments.

FIG. 5 illustrates fuel laminate 208. With brief reference to FIG. 1, heat exchanger 100 may include any number of fuel laminates. Fuel laminate 208 may be made from a metal such as aluminum. Fuel laminate 208 includes axial fuel-in channel 220, axial oil-in channel 222, axial oil-out channel 224, axial fuel-out channel 221, a cavity 504 and pins 502. Any or all of the fuel or oil channels may be machined or etched into fuel laminate 208. Furthermore, cavity 504 and pins 502 may be etched or machined such that after etching and/or machining, pins 502 and cavity 504 remain. Fuel laminate 208 may include any number of axial fuel-in channels, axial fuel-out channels, axial oil-in channels and/or axial oil-out channels. Furthermore, each of the oil and/or fuel channels may have any shape, such as circular, rectangular, triangular or the like.

FIG. 5, pins 502 are only illustrated in a portion of fuel laminate 208. However, pins may be positioned anywhere within cavity 504. Fuel may flow into fuel laminate 208 via any of the axial fuel-in channels. Fuel may then continue flow into cavity 504 between pins 502, such that the pins 502 create additional surface area for heat to be transferred into the fuel, increasing heat transfer efficiency. In various embodiments, other shapes or no shapes may be etched or machined on fuel laminate 208 instead of pins 502.

After heat has been transferred to fuel via pins 502 and/or fuel laminate 208, fuel may flow towards and into axial fuel-out channel 221, from where it will eventually flow out of fuel outlet 108.

Axial oil-in channel 222 and axial oil-out channel 224 are machined or etched such that oil may not flow into area between pins 502 of fuel laminate 208. This prevents oil from mixing with fuel which may be undesired.

Figure 6:
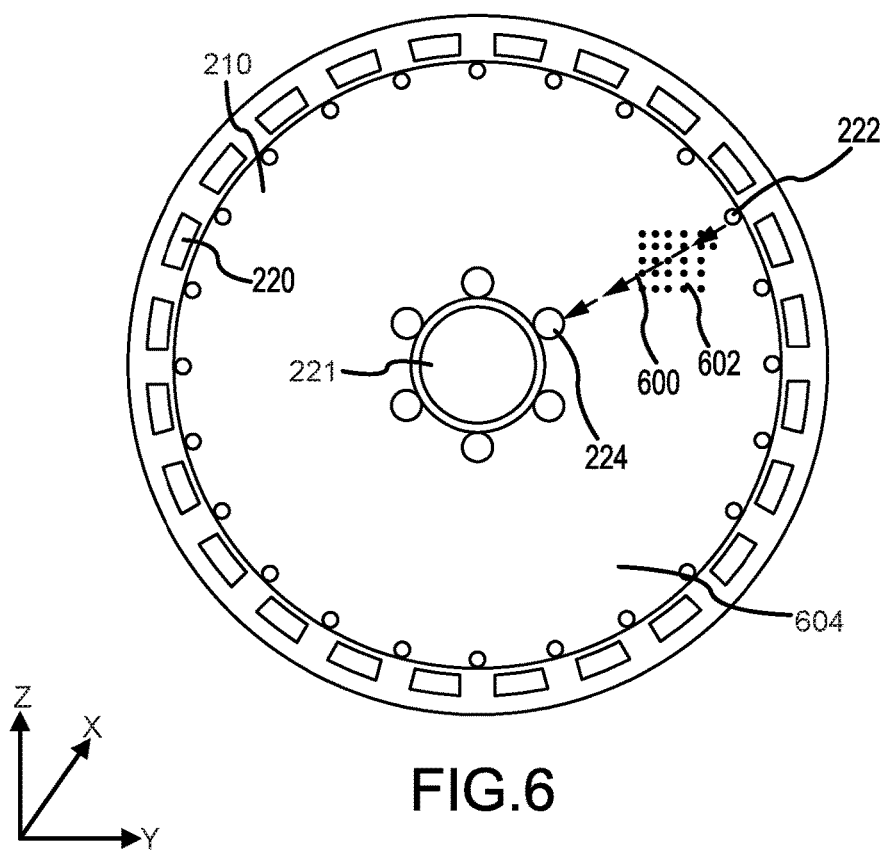
FIG. 6 illustrates an oil laminate, in accordance with various embodiments.

FIG. 6 illustrates oil laminate 210. With brief reference to FIG. 1, heat exchanger 100 may include any number of oil laminates. It is preferred to have an equal number of oil laminates as fuel laminates. As illustrated, oil laminate 210 may include axial fuel-in channel 220, axial fuel-out channel 221, axial oil-in channel 222, axial oil-out channel 224, a cavity 604 and pins 602. Oil laminate 210 may be made from metal such as aluminum. Any or all fuel or oil channels may be machined or etched into oil laminate 210. Furthermore, cavity 604 and pins 602 may be etched or machined such that after etching and/or machining, pins 602 and cavity 604 remain. Oil laminate 210 may include any number of axial fuel-in channels, axial fuel-out channels, axial oil-in channels and/or axial oil-out channels. Furthermore, each of the oil and/or fuel channels may have any shape, such as circular, rectangular, triangular or the like.

In FIG. 6, pins 602 are illustrated only in a portion of oil laminate 210. Pins 602 may be machined or etched into the entire cavity 604. Other designs or objects may be etched or machined instead of pins 602. Fuel may flow from axial oil-in channel 222 into cavity 604 where it contacts pins 602. The heat from the oil transfers to the pins 602. From the oil laminate 210 and/or pins 602, heat travels to an adjacent fuel laminate 208, such that the heat is transferred to pins 502 of FIG. 5, where it transfers to fuel. In this way, heat is transferred between oil and fuel via pins 602 of FIG. 6 and pins 502 of FIG. 5. Oil may flow radially inward towards axial oil-out channel 224 as heat is transferred.

Axial fuel-in channel 220 and axial fuel-out channel 221 are machined or etched such that fuel may not flow onto oil laminate 210 via axial fuel-in channel 220 or axial fuel-out channel 221. This prevents oil and fuel from mixing, which may be undesirable.

With brief reference to FIG. 2, heat exchanger 100 may include many oil laminates and fuel laminates. The axial fuel-in channels of oil laminates and fuel laminates may be aligned such that fuel may flow axially to each fuel laminate 208 of heat exchanger 100. Similarly, the axial fuel-out channels of each laminate may be aligned such that fuel may travel axially within heat exchanger 100. Similarly, each axial oil-in channel 222 may be aligned on each laminate such that oil may flow axially within heat exchanger 100. Likewise, each axial oil-out channel 224 of each laminate may be aligned such that oil may flow axially within heat exchanger 100.

After each axial end plate, annulus plate and laminate has been machined, the plates are aligned axially and brazed together. This causes each plate and each laminate to be affixed together.

Heat exchanger 100 presents advantages over traditional heat exchangers. Being cylindrical, heat exchanger 100 is structurally sound. Rounded objects, such as cylinders, are more resistant to pressure and heat stresses. Therefore, heat exchanger 100 will be able to withstand pressure and heat. Similarly, by using a fuel annulus, heat exchanger 100 is adapted to not become clogged in response to receiving frozen fuel.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat exchanger for use in an aircraft comprising:
    a first axial end and a second axial end;
    a first axial end plate positioned at the first axial end and defining a first inlet configured to receive a first fluid;
    a second axial end plate positioned at the second axial end and defining a second inlet configured to receive a second fluid;
    a first fluid laminate defining only one cavity through which the first fluid flows radially inward, the only one cavity defined by the first fluid laminate being a first fluid cavity that is in fluid communication with and downstream from the first inlet such that at least a portion of the first fluid flows into the first fluid cavity;
    a second fluid laminate positioned adjacent to and in contact with the first fluid laminate, the first fluid laminate and the second fluid laminate defining a portion of a cylinder, the second fluid laminate defining only one cavity through which the second fluid flows radially inward, the only one cavity defined by the second fluid laminate being a second fluid cavity that is in fluid communication with and downstream from the second inlet such that at least a portion of the second fluid flows into the second fluid cavity, such that heat may transfer between the first fluid and the second fluid via the first fluid laminate and the second fluid laminate;
a first fluid annulus plate, adjacent to and axially inward from the first axial end plate, wherein the first fluid annulus plate and the first axial end plate are physically discrete, the first fluid annulus plate comprising a first annulus cavity extending therethrough that is in fluid communication with the first inlet and the first fluid cavity such that the first fluid cavity is downstream from the first annulus cavity and the first annulus cavity is downstream from the first inlet; and
a second fluid annulus plate, adjacent to and axially inward from the second axial end plate, wherein the second fluid annulus plate and the second axial end plate are physically discrete, the second fluid annulus plate comprising a second annulus cavity extending therethrough that is in fluid communication with the second inlet and the second fluid cavity such that the second fluid cavity is downstream from the second annulus cavity and the second annulus cavity is downstream from the second inlet; wherein
the second axial end plate further defines a first outlet in fluid communication with and downstream from the first fluid cavity such that the first fluid may exit the heat exchanger, wherein the first fluid flows in a single axial direction from the first axial end plate to the second axial end plate, and
the first axial end plate further defines a second outlet in fluid communication with and downstream from the second fluid cavity such that the second fluid may exit the heat exchanger, wherein the second fluid flows in a single axial direction from the second axial end plate to the first axial end plate.

2. The heat exchanger of claim 1, wherein the first fluid is a fuel and the second fluid is an oil.

3. The heat exchanger of claim 1, wherein the first fluid laminate includes a pin positioned within the first fluid cavity and configured to increase an efficiency of heat transfer and the second fluid laminate includes a pin positioned within the second fluid cavity and configured to increase the efficiency of heat transfer.

4. The heat exchanger of claim 1, further comprising:
a third fluid laminate positioned adjacent the second fluid laminate and defining a third fluid cavity that is in fluid communication with the first fluid cavity; and
a fourth fluid laminate positioned adjacent the third fluid laminate and defining a fourth fluid cavity that is in fluid communication with the second fluid cavity.

5. The heat exchanger of claim 4, wherein the first fluid laminate, the second fluid laminate, the third fluid laminate and the fourth fluid laminate define:
an axial first fluid in channel downstream from the first inlet and in fluid communication with the first fluid cavity and the third fluid cavity;
an axial second fluid in channel downstream from the second inlet and in fluid communication with the second fluid cavity and the fourth fluid cavity;
an axial first fluid out channel downstream from and in fluid communication with the first fluid cavity and the third fluid cavity; and
an axial second fluid out channel downstream from and in fluid communication with the second fluid cavity and the fourth fluid cavity.

6. The heat exchanger of claim 5, wherein the axial first fluid in channel is positioned radially outward from the axial first fluid out channel and the axial second fluid in channel is positioned radially outward from the axial second fluid out channel.

7. The heat exchanger of claim 5, wherein the axial first fluid in channel includes multiple axial first fluid in channels.

8. The heat exchanger of claim 5, wherein the axial first fluid out channel includes multiple axial first fluid out channels.

9. The heat exchanger of claim 1 wherein:
the first fluid laminate has a first axial surface that defines the first fluid cavity;
the first fluid cavity is defined by greater than half of the first axial surface;
the second fluid laminate has a second axial surface that defines the second fluid cavity; and
the first fluid cavity is defined by greater than half of the second axial surface.

10. The heat exchanger of claim 3 wherein the pin of the first fluid laminate is machined into the first fluid laminate, and the pin of the second fluid laminate is machined into the second fluid laminate.

11. A heat exchanger for transferring thermal energy between a fuel and an oil, the heat exchanger comprising:
a longitudinal axis; and
a plurality of plates positioned adjacent each other along the longitudinal axis such that the plurality of plates defines a cylinder, the plurality of plates including:
a first axial end plate defining an oil inlet and a fuel outlet,
a second axial end plate defining a fuel inlet and an oil outlet,
a first fuel laminate defining only one cavity through which the fuel flows radially inward, the only one cavity defined by the first fuel laminate being a first fuel cavity that is in fluid communication with and downstream from the fuel inlet such that at least some of the fuel flows into the first fuel cavity,
a first oil laminate adjacent the first fuel laminate and defining only one cavity through which the oil flows radially inward, the only one cavity defined by the first oil laminate being a first oil cavity that is in fluid communication with and downstream from the oil inlet such that at least some of the oil flows into the first oil cavity,
a fuel annulus plate separate from the first axial end plate comprising a first annulus cavity extending therethrough that is in fluid communication with the fuel inlet and the first fuel cavity such that the first fuel cavity is downstream from the first annulus cavity and the first annulus cavity is downstream from the fuel inlet, wherein the fuel flows in a single axial direction from the first axial end plate to the second axial end plate, and
an oil annulus plate separate from the second axial end plate comprising a second annulus cavity extending therethrough that is in fluid communication with the oil inlet and the first oil cavity such that the first oil cavity is downstream from the second annulus cavity and the second annulus cavity is downstream from the oil inlet, wherein the oil flows in a single axial direction from the second axial end plate to the first axial end plate.

12. The heat exchanger of claim 11, wherein the first fuel laminate includes a pin positioned within the first fuel cavity and the first oil laminate includes a pin positioned within the first oil cavity.

13. The heat exchanger of claim 11, wherein the plurality of plates includes:
   a second fuel laminate positioned adjacent the first oil laminate and defining a second fuel cavity that is in fluid communication with the first fuel cavity; and
   a second oil laminate positioned adjacent the second fuel laminate and defining a second oil cavity that is in fluid communication with the first oil cavity.

14. The heat exchanger of claim 13, wherein the first fuel laminate, the first oil laminate, the second fuel laminate and the second oil laminate define:
   an axial fuel in channel downstream from the fuel inlet and in fluid communication with the first fuel cavity and the second fuel cavity;
   an axial oil in channel downstream from the oil inlet and in fluid communication with the first oil cavity and the second oil cavity;
   an axial fuel out channel downstream from and in fluid communication with the first fuel cavity and the second fuel cavity; and
   an axial oil out channel downstream from and in fluid communication with the first oil cavity and the second oil cavity.

\* \* \* \* \*